United States Patent
Zwisler et al.

(10) Patent No.: US 8,065,558 B2
(45) Date of Patent: Nov. 22, 2011

(54) DATA VOLUME REBUILDER AND METHODS FOR ARRANGING DATA VOLUMES FOR IMPROVED RAID RECONSTRUCTION PERFORMANCE

(75) Inventors: Ross E. Zwisler, Lafayette, CO (US); Brian D. McKean, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 246 days.

(21) Appl. No.: 12/409,559

(22) Filed: Mar. 24, 2009

(65) Prior Publication Data

US 2010/0251012 A1     Sep. 30, 2010

(51) Int. Cl.
G06F 11/00 (2006.01)
(52) U.S. Cl. .................. 714/6.22; 714/6.2; 714/6.3
(58) Field of Classification Search ............... 714/7, 6.2, 714/6.22, 6.3
See application file for complete search history.

(56) References Cited

U.S. PATENT DOCUMENTS

| | | | | |
|---|---|---|---|---|
| 5,258,984 A * | 11/1993 | Menon et al. | | 714/7 |
| 5,485,571 A * | 1/1996 | Menon | | 714/7 |
| 5,657,439 A * | 8/1997 | Jones et al. | | 714/7 |
| 2003/0225970 A1* | 12/2003 | Hashemi | | 711/114 |
| 2004/0236986 A1* | 11/2004 | Ng | | 714/7 |
| 2007/0088990 A1* | 4/2007 | Schmitz | | 714/700 |
| 2008/0126838 A1* | 5/2008 | Sangapu et al. | | 714/5 |
| 2008/0126839 A1* | 5/2008 | Sangapu et al. | | 714/5 |
| 2008/0243773 A1* | 10/2008 | Patel et al. | | 707/2 |
| 2009/0327603 A1* | 12/2009 | McKean et al. | | 711/114 |

OTHER PUBLICATIONS

Suzhen Wu, Workout: I/O Workload Outsourcing for Boosting RAID Reconstruction Performance, Fast '09: 7th USENIX Conference on File and Storage Technologies, pp. 239-252.

* cited by examiner

*Primary Examiner* — Robert Beausoliel, Jr.
*Assistant Examiner* — Joshua P Lottich
(74) *Attorney, Agent, or Firm* — Daniel J. Santos; Robert A. Blaha

(57) ABSTRACT

A data volume rebuilder reduces the time required to reconstruct lost data in a RAID protected data volume operating with a failed physical disk drive. A data volume rebuilder uses the remaining functioning physical disk drives in the RAID protected data volume operating with the failed disk to regenerate the lost data and populate a virtual hot spare store allocated in a separate RAID protected data volume. The recovered data is distributed across the physical disk drives supporting the virtual hot spare store. Once the virtual hot spare store is populated, the data volume can recover from a subsequent failure of a second physical disk drive in either RAID group. After replacement of the failed physical disk drive, the data volume rebuilder moves the recovered data from the virtual hot spare store to the new physical disk drive.

19 Claims, 10 Drawing Sheets

DATA VOLUME REBUILDER AND METHODS FOR ARRANGING DATA VOLUMES FOR IMPROVED RAID RECONSTRUCTION PERFORMANCE

TECHNICAL FIELD

The present application relates generally to data-storage systems and, more particularly, to systems and methods for reconstructing a redundant array of inexpensive or independent disks (RAID) based storage volume.

BACKGROUND

The acronym "RAID" is an umbrella term for data-storage schemes that can divide and replicate data among multiple hard-disk drives. When several physical hard-disk drives are set up to use RAID technology, the hard-disk drives are said to be in a RAID group. The RAID group distributes data across several hard-disk drives, but the RAID group is exposed to the operating system as a single logical disk drive or data storage volume.

Although a variety of different RAID system designs exist, all have two key design goals, namely: (1) to increase data reliability and (2) to increase input/output (I/O) performance. RAID has seven basic levels corresponding to different system designs. The seven basic RAID levels, typically referred to as RAID levels 0-6, are as follows. RAID level 0 uses striping to achieve increased I/O performance. The term "striped" means that logically sequential data, such as a single data file, is fragmented and assigned to multiple physical disk drives in a round-robin fashion. Thus, the data is said to be "striped" over multiple physical disk drives when the data is written. Striping improves performance and provides additional storage capacity. The fragments are written to their respective physical disk drives simultaneously on the same sector. This allows smaller sections of the entire chunk of data to be read off the drive in parallel, providing improved I/O bandwidth. The larger the number of physical disk drives in the RAID system, the higher the bandwidth of the system, but also the greater the risk of data loss. Parity is not used in RAID level 0 systems, which means that RAID level 0 systems are not fault tolerant. Consequently, when any physical disk drive fails, the entire system fails.

In RAID level 1 systems, mirroring without parity is used. Mirroring corresponds to the replication of stored data onto separate physical disk drives in real time to ensure that the data is continuously available. RAID level 1 systems provide fault tolerance from disk errors because all but one of the physical disk drives can fail without causing the system to fail. RAID level 1 systems have increased read performance when used with multi-threaded operating systems, but also have a reduction in write performance.

In RAID level 2 systems, redundancy is used and physical disk drives are synchronized and striped in very small stripes, often in single bytes/words. Redundancy is achieved through the use of Hamming codes, which are calculated across bits on physical disk drives and stored on multiple parity disks. If a physical disk drive fails, the parity bits can be used to reconstruct the data. Therefore, RAID level 2 systems provide fault tolerance. That is, failure of a single physical disk drive does not result in failure of the system.

RAID level 3 systems use byte-level striping in combination with interleaved parity bits and a dedicated parity disk. RAID level 3 systems require the use of at least three physical disk drives. The use of byte-level striping and redundancy results in improved performance and provides the system with fault tolerance. However, use of the dedicated parity disk creates a bottleneck for writing data due to the fact that every write requires updating of the parity data. A RAID level 3 data storage system can continue to operate without parity and no performance penalty is suffered in the event that the parity disk fails.

RAID level 4 is essentially identical to RAID level 3 except that RAID level 4 systems employ block-level striping instead of byte-level or word-level striping. Because each stripe is relatively large, a single file can be stored in a block. Each physical disk drive operates independently and many different I/O requests can be handled in parallel. Error detection is achieved by using block-level parity bit interleaving. The interleaved parity bits are stored in a separate single parity disk.

RAID level 5 uses striping in combination with distributed parity. In order to implement distributed parity, all but one of the physical disk drives must be present for the system to operate. Failure of any one of the physical disk drives necessitates replacement of the physical disk drive. However, failure of a single one of the physical disk drives does not cause the system to fail. Upon failure of one of the physical disk drives, any subsequent data read operations can be performed or calculated from the distributed parity such that the physical disk drive failure is masked from the end user. If a second one of the physical disk drives fails, the system will suffer a loss of data. Accordingly, the data storage volume or logical disk drive is vulnerable until the data that was on the failed physical disk drive is reconstructed on a replacement physical disk drive.

RAID level 6 uses striping in combination with dual distributed parity. RAID level 6 systems require the use of at least four physical disk drives, with two of the physical disk drives being used for storing the distributed parity bits. The system can continue to operate even if two physical disk drives fail. Dual parity becomes increasingly important in systems in which each virtual disk is made up of a large number of physical disk drives. RAID level systems that use single parity are vulnerable to data loss until the failed drive is rebuilt. In RAID level 6 systems, the use of dual parity allows a virtual disk having a failed physical disk drive to be rebuilt without risking loss of data in the event that a physical disk drive of one of the other physical disk drives fails before completion of the rebuild of the first failed physical disk drive.

A hot spare disk is a physical disk drive which is flagged for use if another drive in the RAID group fails. RAID 1, RAID 0+1, RAID 3, RAID 5, and RAID 6 all support hot spare disks.

Normally if a physical disk drive fails that is a member of a RAID group, that array will run in a degraded mode. A RAID group operating in degraded mode is not operating at peak efficiency or performance, since not all physical disk drives are present or functioning.

When a hot spare disk is available, the RAID group can immediately start rebuilding stored data in the RAID group to the hot spare standby disk, without manual intervention. As soon as the rebuild completes, the RAID group operates at full functionality and performance. Thereafter, the failed physical disk drive can be replaced, and the new replacement drive becomes the hot spare disk.

FIGS. 1A-1D illustrate a known arrangement and method for using a hot spare disk to restore a data volume operating in a degraded mode. FIG. 1A shows a data volume 10 including a group of four physical disk drives. A data volume such as the data volume 10 is exposed to users of the data as a single logical drive. Physical disk drives D1 through D3 are designated for storing data. When the data volume 10 is supported by a RAID architecture that uses a dedicated parity disk drive, one of the physical disk drives D1-D3 is designated for storing parity information that is calculated from corresponding portions (e.g., similarly sized blocks) of the data in the other physical disk drives of the RAID group. The parity information is stored at a corresponding location in the dedicated parity disk drive. For example, in one RAID architecture or arrangement, D3 is a dedicated parity disk drive.

In the event of a physical disk drive failure of one of D1 or D2, the parity information stored in D3 can be used to regenerate the corresponding lost portion of either D1 or D2 that was used to generate the parity information. The physical disk drive labeled SPARE is provided as a hot spare or standby disk. When one of the physical disk drives D1 or D2 fails (i.e., data can no longer be written to and or read from the physical disk drive), as shown in FIG. 1B, the data volume 10a operates in a degraded mode using the data stored in D2 and the parity information stored in D3.

As further indicated in FIG. 1C, the data volume 10b, which is operating in a degraded mode due to the failure of physical disk drive D1, enters a data reconstruction mode, during which, data from physical disk drive D2 and corresponding parity information from D3 is used to calculate the lost data from D1 which is then transferred to populate corresponding locations in the hot spare or standby disk. During or after completion of the reconstruction process, the failed physical disk drive is removed. Thereafter, as illustrated in FIG. 1D, a new physical disk drive is inserted where the failed physical disk drive D1 was formerly located in the data volume 10c. The new physical disk drive becomes a hot spare or standby disk for the data volume 10c.

When the data volume 10 is supported by a RAID architecture that uses distributed parity information, each of the physical disk drives D1-D3 stores both data volume and parity information that is calculated from corresponding portions (e.g., similarly sized blocks) of the data volume information stored in the other physical disk drives of the RAID group. The RAID architecture dictates the location of the data volume information and the corresponding parity information.

As physical disk drive capacities continue to outpace improvements in input/output interface data rates, hot spare rebuild times become increasingly problematic. When a physical disk drive fails in a RAID group with a hot spare disk, the reconstruction algorithm steps through the data stored in the RAID group by reading a portion of data from the remaining functioning physical disk drives and reading the corresponding information from the parity disk and performing an exclusive OR logic operation over the data. The result of the exclusive OR operation is written to the corresponding location in the hot spare disk. Accordingly, all restored data must be written to the hot spare disk drive. Thus, the maximum sustainable write data transfer rate to the media of the hot spare disk drive becomes a critical factor in the time it takes to complete a hot spare rebuild. This is especially true for lower cost physical drives such as serial advanced technology attachment (SATA) drives, which have relatively slower input/output interfaces, larger data storage capacities and higher failure rates.

The time it takes to generate and write the data to the hot spare (i.e., the rebuild time) is critical to the overall reliability of the RAID group. While the hot spare is rebuilding, the RAID group has no redundancy and is vulnerable to a second physical disk drive failure in the data volume 10. For example, it can take many hours and in some cases days to rebuild a failed disk drive in a RAID group of SATA disk drives with terabyte data capacities that is still servicing input/output requests from computing devices.

SUMMARY

An embodiment of a data storage system including data volumes arranged in separate RAID groups includes a data volume rebuilder. The data volume rebuilder has two modes of operation. A first mode of operation is responsive to an indication that a first RAID group is operating with a failed physical disk drive. The first mode of operation performs a step-wise reconstruction of the data lost in the failed physical disk drive in the first RAID group in a virtual hot spare distributed across the respective physical disk drives of a second RAID group. A second mode of operation is responsive to an indication that the failed physical disk drive has been replaced with a functional replacement disk drive. The second mode of operation transfers the reconstructed data from the virtual hot spare to the replacement disk drive.

An embodiment of a method for arranging a group of data volumes each stored in a separate redundant array of independent disks (RAID) includes the steps of identifying a first RAID group and a second RAID group, allocating a portion of the storage capacity of each of the physical disk drives in one of the first RAID group or the second RAID group as a first virtual hot spare store for data in the remaining RAID group.

An embodiment of a method for providing respective virtual hot spares for data volumes stored in a redundant array of independent disks (RAID) includes the steps of identifying a group of data volumes including M members, each of the M members forming a respective data volume stored in a set of physical disk drives, where M is an integer, providing a M+1$^{th}$ group of physical disk drives and allocating a portion of the storage capacity of each of the physical disk drives in the M+1$^{th}$ group as a virtual hot spare store for data stored in one of the data volumes within the M groups.

The figures and detailed description that follow are not exhaustive. The disclosed embodiments are illustrated and described to enable one of ordinary skill to make and use the data volume rebuilder and methods for arranging data volumes. Other embodiments, features and advantages of the data volume rebuilder and methods for arranging data volumes will be or will become apparent to those skilled in the art upon examination of the following figures and detailed description. All such additional embodiments, features and advantages are within the scope of the data volume rebuilder and the methods as defined in the accompanying claims.

BRIEF DESCRIPTION OF THE FIGURES

The data volume rebuilder and methods for arranging data volumes for improved RAID reconstruction performance can be better understood with reference to the following figures. The elements and features within the figures are not necessarily to scale, emphasis instead being placed upon clearly illustrating the principles for providing a distributed virtual hot spare in a RAID group separate from the RAID group where a failed physical disk drive is located. Moreover, in the figures, like reference numerals designate corresponding parts throughout the different views.

DETAILED DESCRIPTION

Hot spare disk drive rebuild reliability is addressed by using virtual hot spares in lieu of one or more physical disk drives. The virtual hot spares are data volumes supported in another RAID group. By using a virtual hot spare instead of a physical disk drive, the data write operations that need to be performed to rebuild the failed drive's data can be spread across multiple physical drive drives. This reduces the bottleneck of transferring data using a single hot spare disk's input/output interface and enables a faster rebuild of the RAID group.

In addition to decreasing the hot spare rebuild time, the use of virtual hot spares increases overall fault tolerance, increases data throughput to existing volume groups and enables the use of variably sized hot spares. When virtual hot spares are located in RAID groups, an extra layer of data protection is provided against multiple physical disk drive failures as the data in the virtual hot spare is shared across the physical disk drives and protected by the parity disk in the RAID group hosting the virtual hot spare.

The following is an example of how introducing respective virtual hot spares in a pair of RAID groups can lead to increased performance. Instead of having two 4+1 RAID 5 groups with a single hot spare disk in each RAID group, a virtual hot spare can be allocated to each group of a 5+1 RAID 5 group. Because the data volume in each RAID group is striped across an extra physical disk drive, normal input/output data transfers can be performed in less time.

When multiple RAID groups are composed of physical disk drives having varying capacities, the data storage space for the virtual hot spare can be allocated on-the-fly to match the data storage capacity of whatever size physical disk drive happens to fail.

The data volume rebuilder reduces the time required to reestablish the safety provided by storing data redundantly in a RAID group. Once the failed physical disk drive has been replaced by a new physical disk drive and the virtual hot spare has been populated, the restored data in the virtual hot spare can be moved in a step-wise manner to the new physical disk drive. The data volume rebuilder not only reduces the time required to reestablish the safety provided by storing data redundantly in a separate RAID group, the data volume rebuilder is capable of restoring data from a virtual hot spare when a second physical disk drive failure occurs.

Figure 1A:
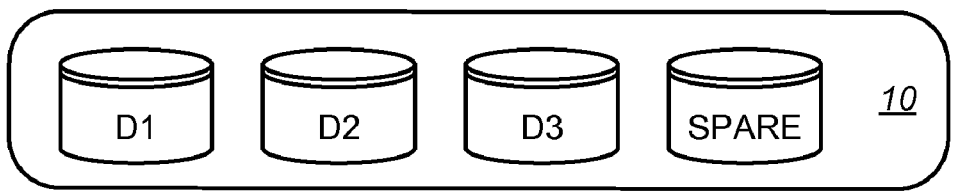
FIGS. 1A-1D are schematic diagrams illustrating a data volume using a conventional RAID-based arrangement of three data disks and a dedicated hot spare disk.
Figure 1B:
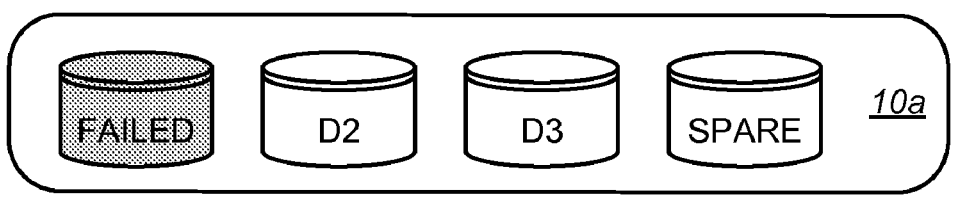
Figure 1C:
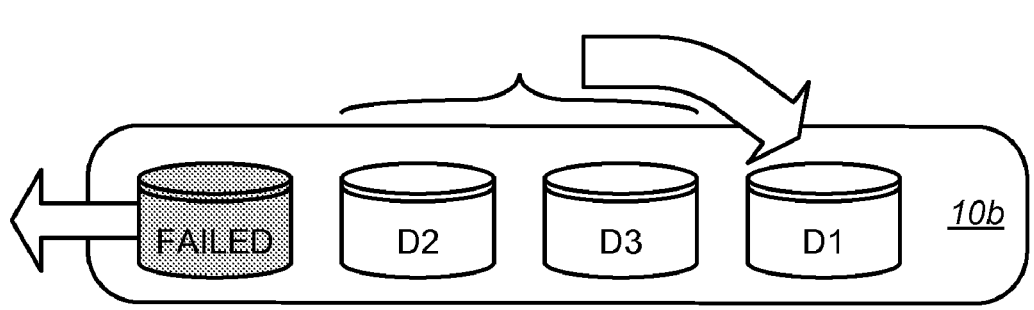
Figure 1D:
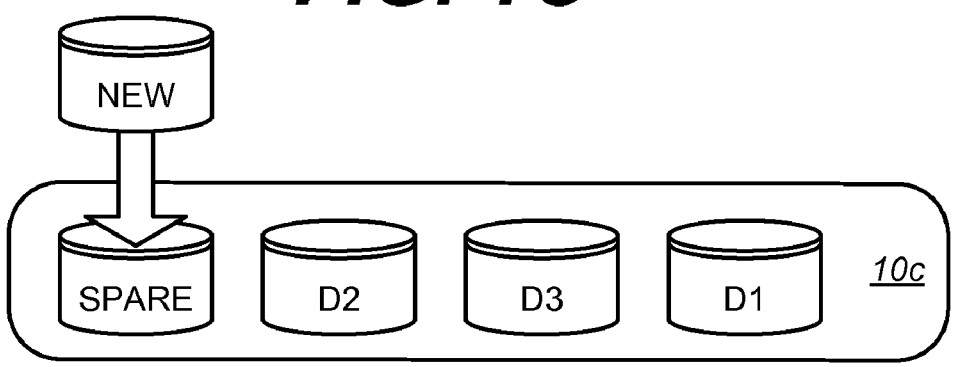
Figure 2:
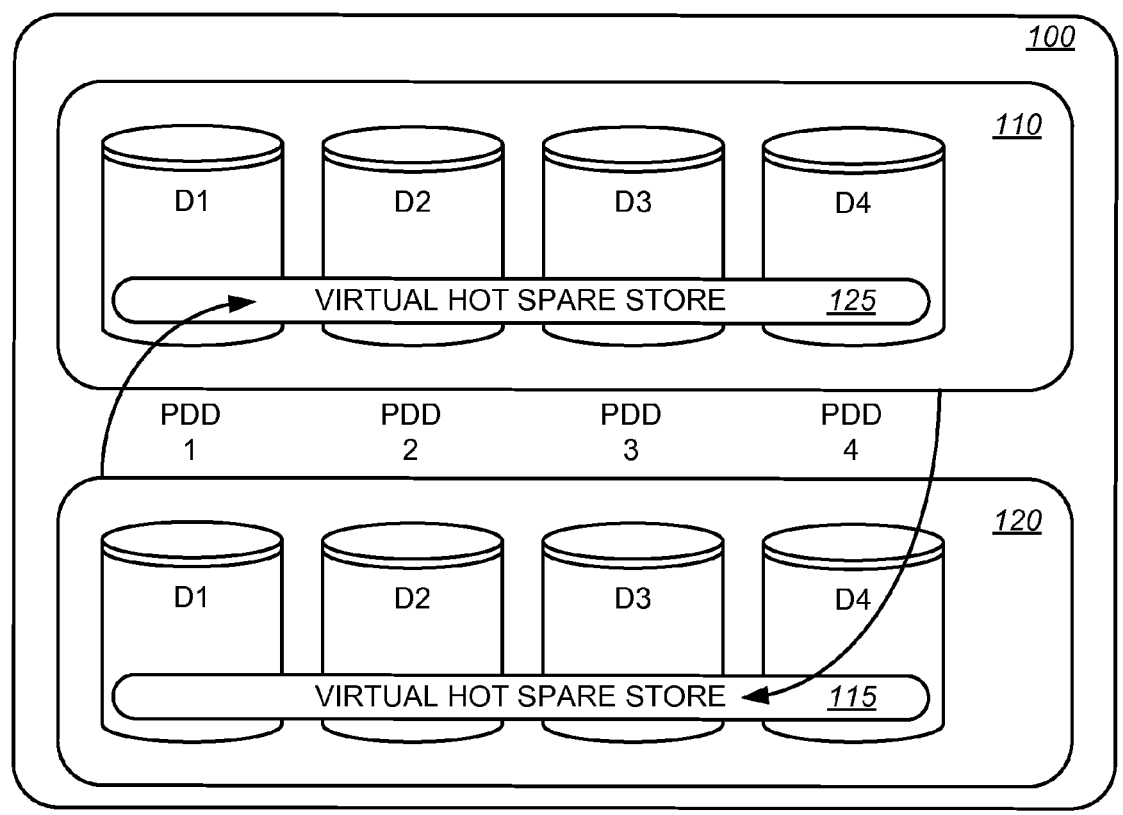
FIG. 2 is a schematic diagram illustrating an embodiment of a data storage system.

FIG. 2 is a schematic diagram illustrating an embodiment of a data storage system 100. The data storage system 100 includes a first data volume 110 and a second data volume 120. The first data volume 110 is supported by a first RAID group of N physical disk drives, where N is an integer. The second data volume 120 is supported by a second RAID group of P physical disk drives, where P is an integer. In the illustrated embodiment, N is equal to four and P is equal to four. However, data storage systems that use the data volume rebuilder and methods for arranging data volumes for improved RAID reconstruction performance are not so limited.

In each of the first RAID group and the second RAID group, a respective first physical disk drive, D1, is arranged at a first physical disk drive location labeled PDD 1. In each of the first RAID group and the second RAID group, a respective second physical disk drive, D2, is arranged at a second physical disk drive location labeled PDD 2. In each of the first RAID group and the second RAID group, a respective third physical disk drive, D3, is arranged at a third physical disk drive location labeled PDD 3. In each of the first RAID group and the second RAID group, a respective fourth physical disk drive, D4, is arranged in a fourth physical disk drive location labeled PDD 4.

As further illustrated in FIG. 2, a portion of the storage capacity of each of the N physical disk drives in the first data volume 110 is allocated to a virtual hot spare store 125 for the data stored in the data volume 120. Conversely, a portion of the storage capacity of each of the P physical disk drives in the second data volume 120 is allocated to a virtual hot spare store 115 for the data stored in the data volume 110. Once allocated, the virtual hot spare store 125 distributed and protected by the underlying RAID format used to support the data volume 110 is available to hold restored or reconstructed data from the data stored in the data volume 120. Once allocated, the virtual hot spare store 115 distributed and protected by the underlying RAID format used to support the data volume 120 is available to hold restored or reconstructed data from the data stored in the data volume 110. Either of the virtual hot spare store 115 or the hot spare store 125 can be allocated as needed.

In alternative embodiments (not shown), N can be two or more and P can be two or more. For example, when you have two RAID groups, each with a virtual hot spare store, there is no requirement that the two RAID groups have the same number of physical disk drives. Moreover, there is no requirement that the RAID groups share the same RAID architecture. In these alternative embodiments (not shown), as long as the corresponding virtual hot spare store supported in the other data volume has sufficient available data storage capacity to hold the lost data from a failed physical disk drive, the first data volume 110 can be supported by a first RAID group having an integer number of physical disk drives that is different from the number of physical disk drives supporting the second data volume 120.

Figure 3:
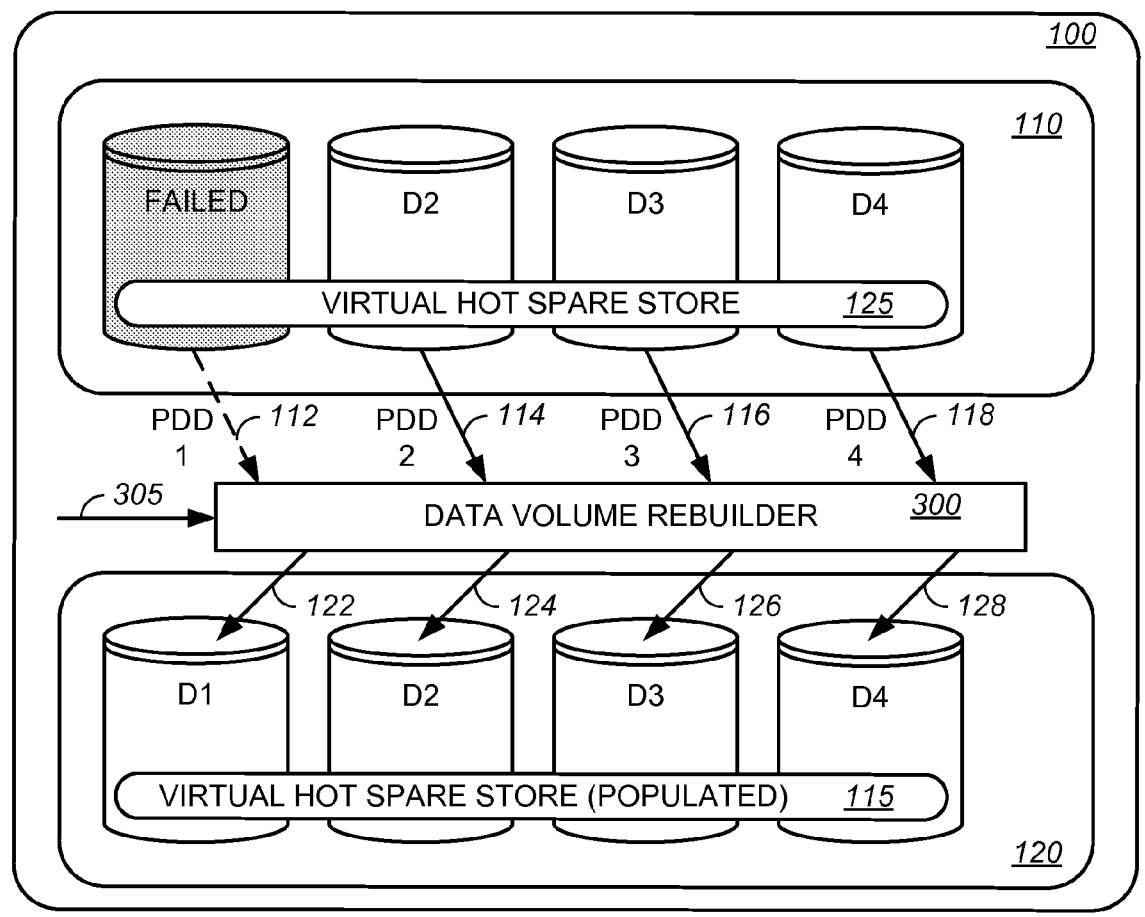
FIG. 3 is a schematic diagram illustrating a first mode of operation of a data volume rebuilder integrated with the data storage system of FIG. 2.

FIG. 3 is a schematic diagram illustrating a first mode of operation of a data volume rebuilder 300 that is integrated with the data storage system 100 of FIG. 2. The data volume rebuilder 300 enters a first mode of operation in response to an indication that a physical disk drive that is supporting one of the data volume 110 or the data volume 120 has failed. A physical disk drive failure is indicated when a identified one of the physical disk drives can no longer be read from or written to successfully. The data volume rebuilder 300 receives an indication that a physical disk drive has failed on connection 305.

In an exemplary embodiment, the connection 305 comprises a single conductor that provides an electrical signal that under a defined condition is associated with a non-functioning physical disk drive such as the physical disk drive, D1, supporting the data volume 110. In an alternative embodiment, the connection 305 is a multiple conductor connection or bus that provides encoded electrical signals that under defined conditions are associated with or otherwise define a particular physical disk drive in one of the data volume 110 or the data volume 120. In addition, the multiple conductor connection or bus provides one or more error conditions, each of which renders the particular physical disk drive unable to support the respective data volume in which the particular physical disk drive is located.

The data volume rebuilder 300 is communicatively coupled to each of the physical disk drives supporting the data volume 110. The data volume rebuilder 300 is also communicatively coupled to each of the physical disk drives supporting the data volume 120. The data volume rebuilder 300 is coupled to the physical disk drives D1, D2, D3 and D4 in data volume 110 by connection 112, connection 114, connection 116 and connection 118, respectively. The data volume rebuilder 300 is coupled to the physical disk drives D1, D2, D3 and D4 in data volume 120 by connection 122, connection 124, connection 126 and connection 128, respectively.

Each of connection 112, connection 114, connection 116, connection 118, connection 122, connection 124, connection 126 and connection 128 support read/write data transfer operations among the various physical disk drives via the data volume rebuilder 300. In the illustrated embodiment, the one-way arrows indicate the movement of data from the functioning physical disk drives in the data volume 110 to the physical disk drives in the virtual hot spare store 115 in the data volume 120 in a first mode of operation.

The data stored in failed drive D1 is reconstructed using data from the remaining functioning disks (i.e., D2, D3 and D4) in the data volume 110. A data reconstruction process is dependent upon the RAID format used to store the data in a particular data volume and the number of physical disk drives in the data volume. In some RAID formats, parity information is stored in a single physical hard disk drive in the group of physical disk drives forming the RAID group. In some other RAID formats, parity information is distributed across the physical disk drives forming the RAID group in a fixed pattern. Once the identity of the failed physical disk drive and the particular parameters of the RAID format are known, software or hardware based solutions can be implemented and used to process the data from the remaining functioning physical disk drives in a RAID protected data volume to reconstruct the data stored on the failed physical disk drive.

For example, when a physical disk drive in physical disk drive position 1 fails in a RAID protected data volume with three data disks and a dedicated parity disk, each of the data bits in corresponding locations on the remaining operable data disks and the parity disk are successively processed by a logical XOR function to determine the corresponding "lost" bit that should be stored in physical disk drive position 1. The XOR function forces even parity in the corresponding bits of the RAID protected data volume. When the number of logical "1"s in the data disks is odd, the parity disk will be set to a logical "1" to make the number of logical "1"s in the set of physical disk drives D1-D4 even. When the number of logical "1"s in the data disks is even, the parity disk is set to a logical "0" to keep the number of logical "1"s in the set of physical disk drives D1-D4 even. Not only is the reconstruction operation scalable on the byte, word, and block levels, etc., the reconstruction operation is the same whether the failed physical disk drive is storing data or parity information.

Accordingly, the reconstruction process includes a stepwise process through the data or the data and parity information stored in the remaining functional disks of a data volume operating in a reduced mode of operation due to a failed physical disk drive. When a data read operation is requested by a user of the data volume operating in a reduced mode of operation, the data volume rebuilder 300 reconstruction process can be temporarily suspended to process the read request. Data reconstructed as a result of the read operation can be communicated to appropriate physical disk drives to store the recovered data in the virtual hot spare store 115. Once the data read operation has been successfully completed, the reconstruction process can continue through the remaining stored information in the data volume 110.

When a physical disk drive fails in a RAID protected data volume with distributed parity, each of the data and parity bits that should be stored in the failed physical disk drive are reconstructed from the corresponding data and parity information in the remaining functioning physical disk drives.

In most RAID formats the data stored in the data volume 110 is vulnerable to a second failure of a physical disk drive in the RAID group (i.e., a failure of D2, D3 or D4 in the data volume 110) until the data volume rebuilder 300 has completely reconstructed the lost data and populated the hot spare store 115. As described above, a RAID level 6 data volume uses distributed dual parity to enable recovery from two physical disk drive failures. A data volume supported by RAID level 6 is vulnerable to a third failure of a physical disk drive in the RAID group until the data volume rebuilder 300 has completely reconstructed the lost data and populated the hot spare store 115.

Figure 4:
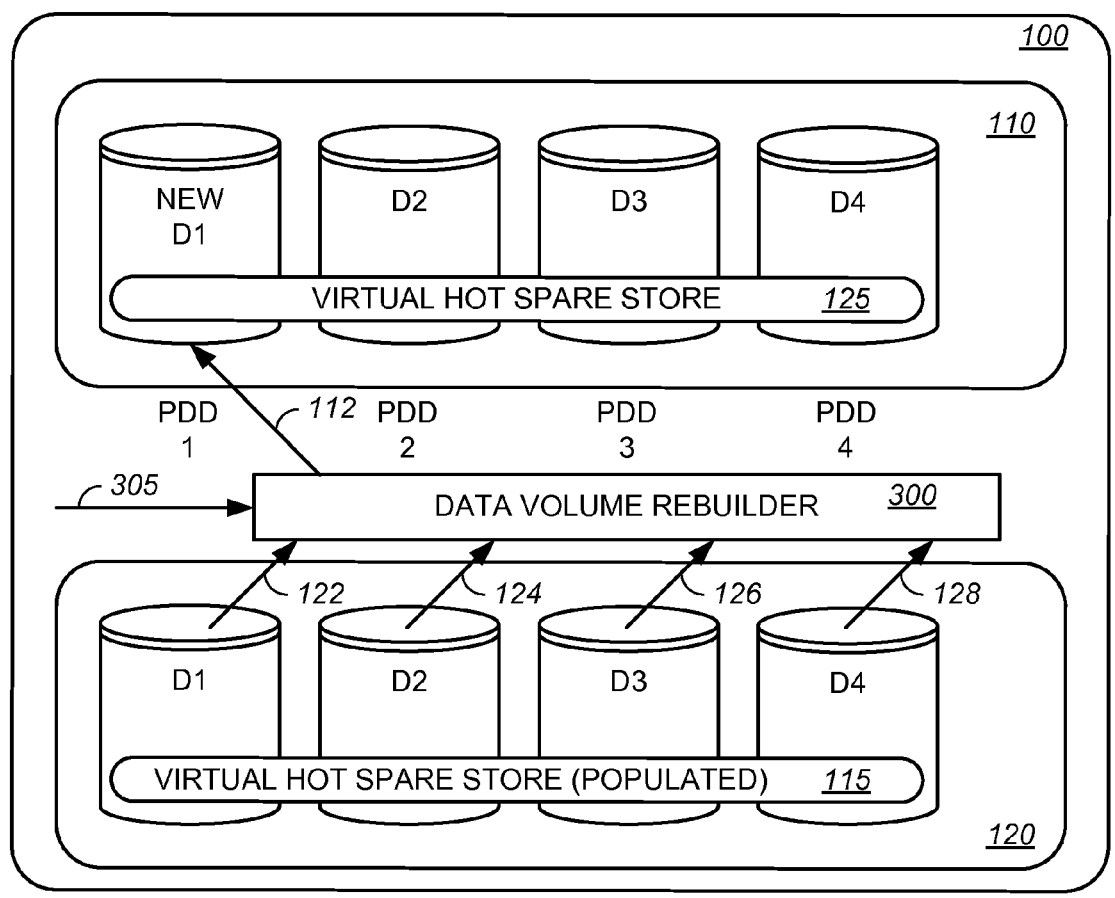
FIG. 4 is a schematic diagram illustrating a second mode of operation of a data volume rebuilder integrated with the data storage system of FIG. 2.

FIG. 4 is a schematic diagram illustrating a second mode of operation of the data volume rebuilder 300. The second mode of operation can be initiated at any time after the failed physical disk drive in the data volume 110 has been replaced by a functioning replacement. The data volume rebuilder 300 receives an indication on connection 305 that a replacement physical disk drive has been introduced in the location where the failed physical disk drive was located in the data volume 110.

Each of connection 112, connection 122, connection 124, connection 126 and connection 128 support read/write data transfer operations among the various physical disk drives via the data volume rebuilder 300. In the second mode of operation, as shown in the illustrated embodiment, the one-way arrows indicate the movement of the reconstructed data from the physical disk drives supporting the virtual hot spare store 115 in the data volume 120 to the replacement physical disk drive (i.e., New D1) in the data volume 110 in a second mode of operation.

The data volume rebuilder 300 and methods for arranging data volumes for improved RAID reconstruction performance can be implemented in hardware, software, or a combination of hardware and software. When implemented in hardware, the data volume rebuilder 300 can be implemented using specialized hardware elements and logic. When the data volume rebuilder 300 is implemented in software, the software can be used to control the various components in an execution system and manipulate the data in coupled RAID groups. The software can be stored in a memory and executed by a suitable instruction execution system (e.g., a microprocessor).

The software can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

A hardware implementation of the data volume rebuilder 300 can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

Figure 5:
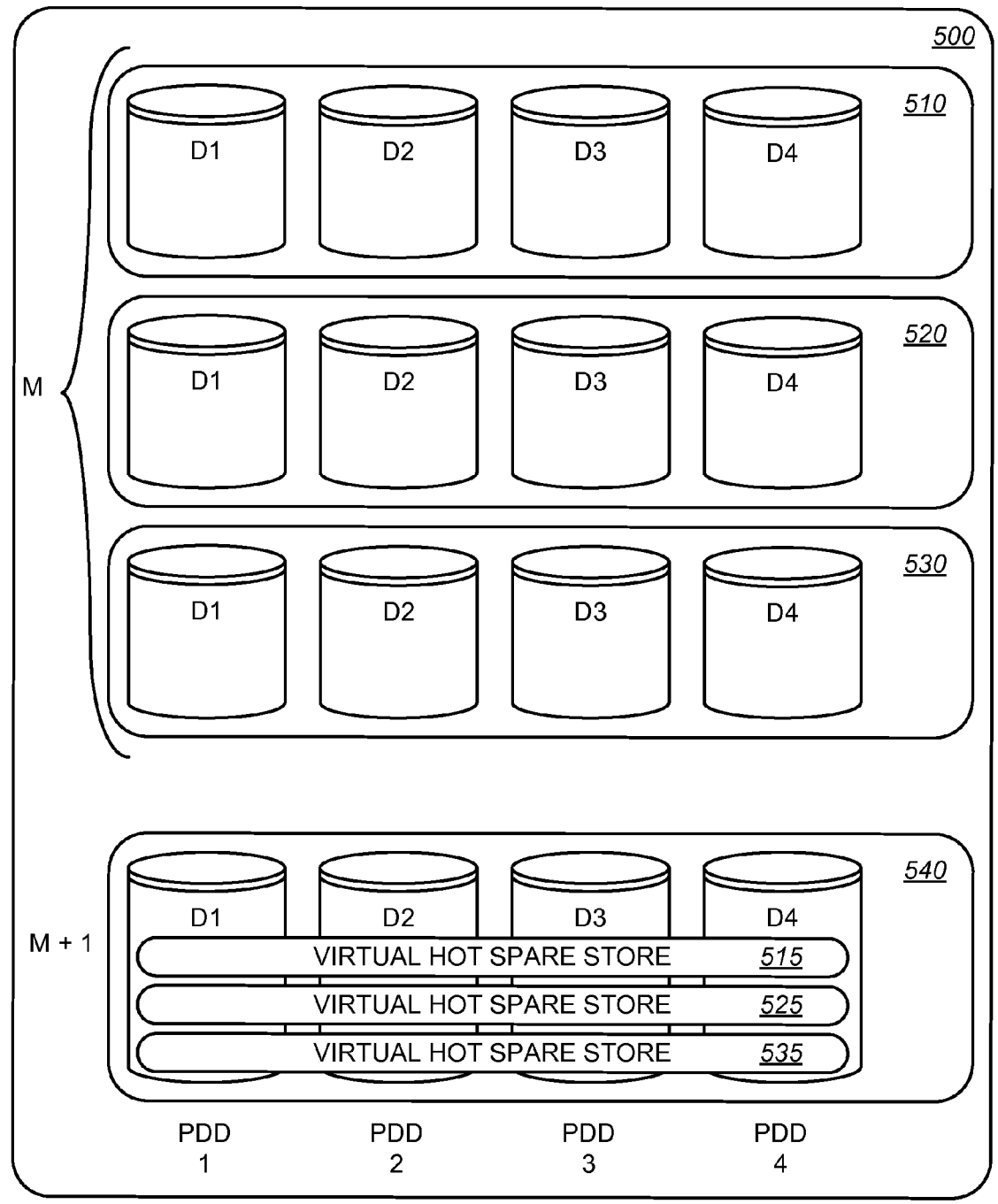
FIG. 5 is a schematic diagram illustrating an alternative embodiment of a data storage system.

FIG. 5 is a schematic diagram illustrating an alternative embodiment of a data storage system 500. The data storage system 500 includes a first data volume 510, a second data volume 520 and a third data volume 530. The first data volume 510 is supported by a first RAID group of N physical disk drives, where N is an integer. The second data volume 520 is supported by a second RAID group of N physical disk drives. The third data volume 530 is supported by a third RAID group of N physical disk drives.

In the illustrated embodiment, N is equal to four. However, data storage systems that use the data volume rebuilder and methods for arranging data volumes for improved RAID reconstruction performance are not so limited. In alternative embodiments, N can be two or more.

As indicated in FIG. 5, the data storage system 500 includes M members of grouped physical disk drives arranged in similarly configured RAID groups. In the illustrated embodiment, M is equal to three. However, data storage systems that use the data volume rebuilder and methods for arranging data volumes for improved RAID reconstruction performance are not so limited. In alternative embodiments, M can be smaller or larger than three.

In each of the M+1 RAID groups, a respective first physical disk drive, D1, is arranged at a first physical disk drive location labeled PDD 1. In each of the M+1 RAID groups, a respective second physical disk drive, D2, is arranged at a second physical disk drive location labeled PDD 2. In each of the M+1 RAID groups, a respective third physical disk drive, D3, is arranged at a third physical disk drive location labeled PDD 3. In each of the M+1 RAID groups, a respective fourth physical disk drive, D4, is arranged in a fourth physical disk drive location labeled PDD 4.

As further illustrated in FIG. 5, the data storage system 500 also includes a data volume 540 appropriately sized to include a suitably sized virtual hot spare store 515 dedicated to support the first data volume 510, a suitable sized hot spare store 525 dedicated to support the second data volume 520 and a suitably sized hot spare store 535 dedicated to support the third data volume 530. Once allocated, the virtual hot spare store 515 distributed and protected by the underlying RAID format used to support the data volume 540 is available to hold restored or reconstructed data from the data stored in the data volume 510. Once allocated, the virtual hot spare store 525 distributed and protected by the underlying RAID format used to support the data volume 540 is available to hold restored or reconstructed data from the data stored in the data volume 520. Once allocated, the virtual hot spare store 535 distributed and protected by the underlying RAID format used to support the data volume 540 is available to hold restored or reconstructed data from the data stored in the data volume 530. The virtual hot spare store 515, the virtual hot spare store 525, or the virtual hot spare store 535 can be allocated as needed.

As indicated above, there is no requirement that the RAID groups supporting each of the data volumes have the same number of physical disk drives. Furthermore, there is no requirement that the RAID groups supporting each of the data volumes share the same RAID architecture. As long as the corresponding virtual hot spare store supported in the data volume 540 has sufficient available data storage capacity to hold the lost data from a failed physical disk drive in the associated data volume it is intended to support, the RAID group supporting the data volume 540 may have an integer number of physical disk drives that is different from the number of physical disk drives supporting one, two or all of data volume 510, the data volume 520 and the data volume 530.

Moreover, there is no requirement that each RAID group supporting each of the data volumes has a 1:1 mapping with a virtual hot spare store. For example, a data storage system could be arranged with 10 RAID groups and only 5 virtual hot spare stores. The virtual hot spare stores are not associated when allocated to a particular RAID group or data volume. Instead, the virtual hot spare stores are assigned at runtime to whichever RAID group has a failed physical disk drive.

Figure 6:
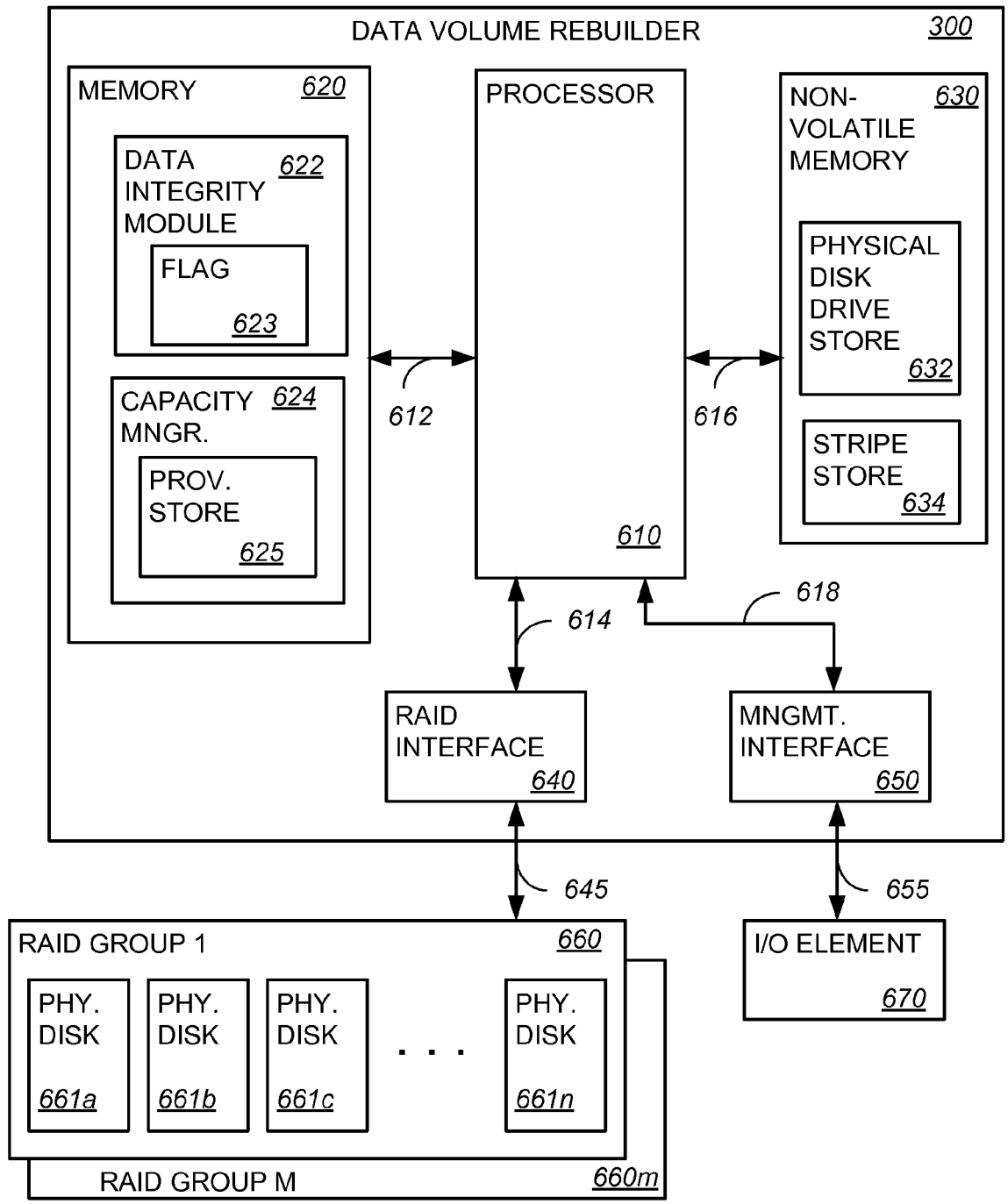
FIG. 6 is a functional block diagram illustrating an embodiment of the data volume rebuilder of FIG. 3 and FIG. 4.

FIG. 6 is a functional block diagram illustrating a hardware embodiment of the data volume rebuilder 300 of FIG. 3 and FIG. 4. As indicated above, the data volume rebuilder 300 can also be implemented in software or a combination of hardware and software.

In the example embodiment, the data volume rebuilder 300 includes a processor 610, a memory 620, a non-volatile memory 630, a RAID interface 640 and a management interface 650. The processor 610, the memory 620, the non-volatile memory 630, the RAID interface 640 and the management interface 650 are communicatively coupled via local connections or busses. The processor 610 is coupled to the memory 620 via a connection 612. The processor 610 is coupled to the RAID interface 640 via a connection 614. The processor 610 is coupled to the non-volatile memory 630 via a connection 616. The processor 610 is coupled to the management interface 650 via a connection 618. Each of the connection 612, the connection 614, the connection 616 and the connection 618 can be, for example but not limited to, one or more buses or other wired or wireless connections, as is known in the art. The connections may have additional elements, which are omitted for simplicity, such as controllers, buffers (caches), drivers, repeaters, and receivers, to enable communications. Further, the connections may include address, control, power and/or data connections to enable appropriate communications among the aforementioned components. Power is provided to each of the processor 610, the memory 620, the non-volatile memory 630, the RAID interface 640 and the management interface 650 in a manner understood by those with ordinary skill in the art. In an alternative embodiment (not shown) the processor 610, the memory 620, the non-volatile memory 630, the RAID interface 640, and the management interface 650 may be coupled to each other via a single bus.

The processor 610 is a hardware device for executing software (i.e., programs or sets of executable instructions), particularly those stored in memory 620. The processor 610 can be any custom made or commercially available processor, a central processing unit (CPU), an auxiliary processor among several processors associated with the data volume rebuilder 300, a semiconductor based microprocessor (in the form of a microchip or chip set), or generally any device for executing instructions.

The memory 620 can include any one or combination of volatile memory elements (e.g., random-access memory (RAM), such as dynamic random-access memory (DRAM), static random-access memory (SRAM), synchronous dynamic random-access memory (SDRAM), etc.) and non-volatile memory elements (e.g., read-only memory (ROM), hard drive, tape, compact disk read-only memory (CD-ROM), etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs or modules each of which comprises an ordered listing of executable instructions for implementing logical functions. In the example embodiment illustrated in FIG. 6, the software in the memory 620 includes data integrity module 622 and capacity manager 624. The data integrity module 622 includes logic that determines when the data in a source strip or block has been successfully copied to a target strip or block on another physical disk drive. The data integrity module 622 may use one or more checksums and or one or more cyclic redundancy checks to verify that the data contents have been successfully transferred from the source strip to the target strip. The data integrity module 622 is configured to set a flag 623 to a known state to indicate when the last data operation was successful. The processor 610 executes subsequent data operations after checking the flag 623. In the illustrated embodiment, the flag 623 is integrated in the memory 620. The data volume rebuilder 300 is not so limited. That is, the flag 623 can be implemented in a register, a switch or other devices that can implement a binary signal in other locations in communication with the processor 610.

The capacity manager 624 includes logic that enables a data storage system administrator to control the allocation of data among the RAID groups 660. The capacity manager 624 uses a provision store 625 to record information including the capacity of various physical disk drives 661, the allocated size of a hot spare store associated with a particular data volume and an identifier that identifies the RAID group where the hot spare store is hosted. The capacity manager 624 is configured to provide enough flexibility to enable an administrator to reallocate a hot spare store until additional storage space can be added to a data volume under control of the capacity manager 624. In addition, the capacity manager 624 may be configured to provide one or more warnings as a data volume consumes physical disk storage capacity.

In the illustrated embodiment, the provision store 625 is integrated in the memory 620. The data volume rebuilder 300 is not so limited. That is, the provision store 625 can be implemented in the non-volatile memory 630 or one or more of the RAID groups 660 in communication with the processor 610.

The non-volatile memory 630 is a memory element that can retain the stored information even when not powered. The non-volatile memory 630 includes a physical disk drive store 632 and a stripe store 634. The physical disk drive store 632 includes a digital representation of the target disk for the present data operation. In an embodiment, the physical disk drive store 632 has a capacity of 2 bytes. Other capacities including those with less storage or more storage than 2 bytes may be used. A storage capacity of 2 bytes can be used to identify 65,536 physical disk drives. The stripe store 634 includes a digital representation of the unique stripe presently being reconstructed. In one embodiment, the stripe store 634 has a capacity of 6 bytes. Other capacities including those with less or more storage than 6 bytes can be used. A storage capacity of 6 bytes can be used to identify $65,536^3$ unique stripes.

The information stored in the non-volatile memory 630 can be used by the data volume rebuilder 300 to recover information from RAID level 1 and RAID level 10 to RAID 5 when one of the physical disks fails. Data recovery is possible because the information in the non-volatile memory 630 together with the data structure of the RAID group provide the necessary information to determine which stripe and physical disk drive was being used in a present step of the step-wise reconstruction and data transfer processes.

The RAID interface 640 includes elements for communicating via one or more protocols over bus 645 to the physical disks 661a-661n of the RAID group 660. The RAID interface 640 may provide front-end interfaces and back-end interfaces (not shown). A back-end interface communicates with controlled physical disks such as the physical disks 661a-661n. Presently known protocols for communicating with physical disk drives include the advanced technology attachment (ATA) (also known as integrated device electronics (IDE) or parallel advanced technology attachment (PATA), serial advanced technology attachment (SATA), small computer system interface (SCSI), fibre channel (FC) or serial attached SCSI (SAS). A front-end interface communicates with a computer's host bus adapter (not shown) and uses one of ATA, SATA, SCSI, FC, fiber connectivity/enterprise system connection (FICON/ESCON), Internet small computer system interface (iSCSI), HyperSCSI, ATA over Ethernet or Infini-Band. The data volume rebuilder 300 may use different protocols for back-end and for front-end communication.

The management interface 650 includes logic and one or more buffers that enable a user to communicate information with the data volume rebuilder 300 using an input/output (I/O) element 670 coupled to the management interface on connection 655. The I/O element 670 represents any interface with which a user may interact with the data volume rebuilder 300. For example, the I/O element 670 may include a speaker, a display, a keyboard, a microphone, a trackball, a thumbwheel, or any other user-interface element.

Figure 7:
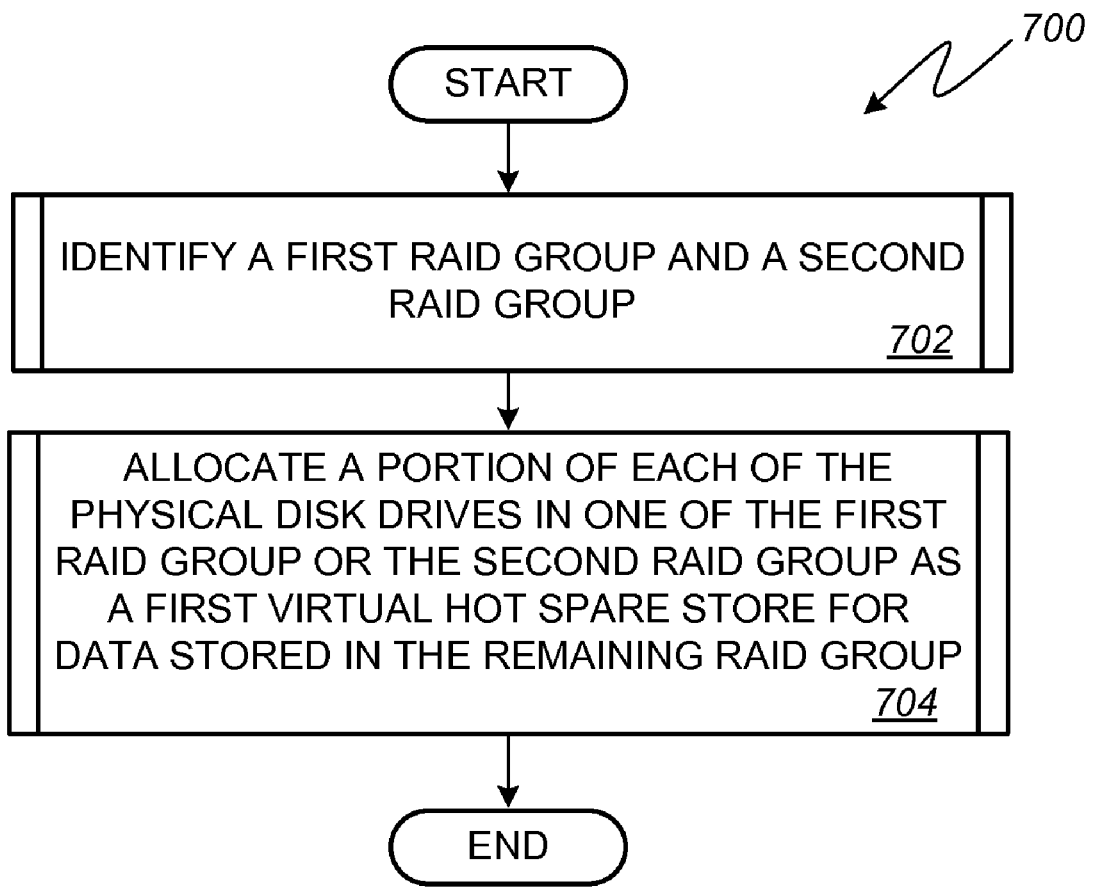
FIG. 7 is a flow diagram illustrating an embodiment of a method for arranging a data storage system with a virtual hot spare store.

FIG. 7 is a flow diagram illustrating an embodiment of a method 700 for arranging a data storage system with a virtual hot spare store. Method 700 begins with block 702 where a first RAID group and a second RAID group are identified. Thereafter, in block 704, a portion of each of the physical disk drives in one of the first RAID group or the second RAID group are allocated as a first virtual hot spare store for data stored in the remaining RAID group.

Figure 8:
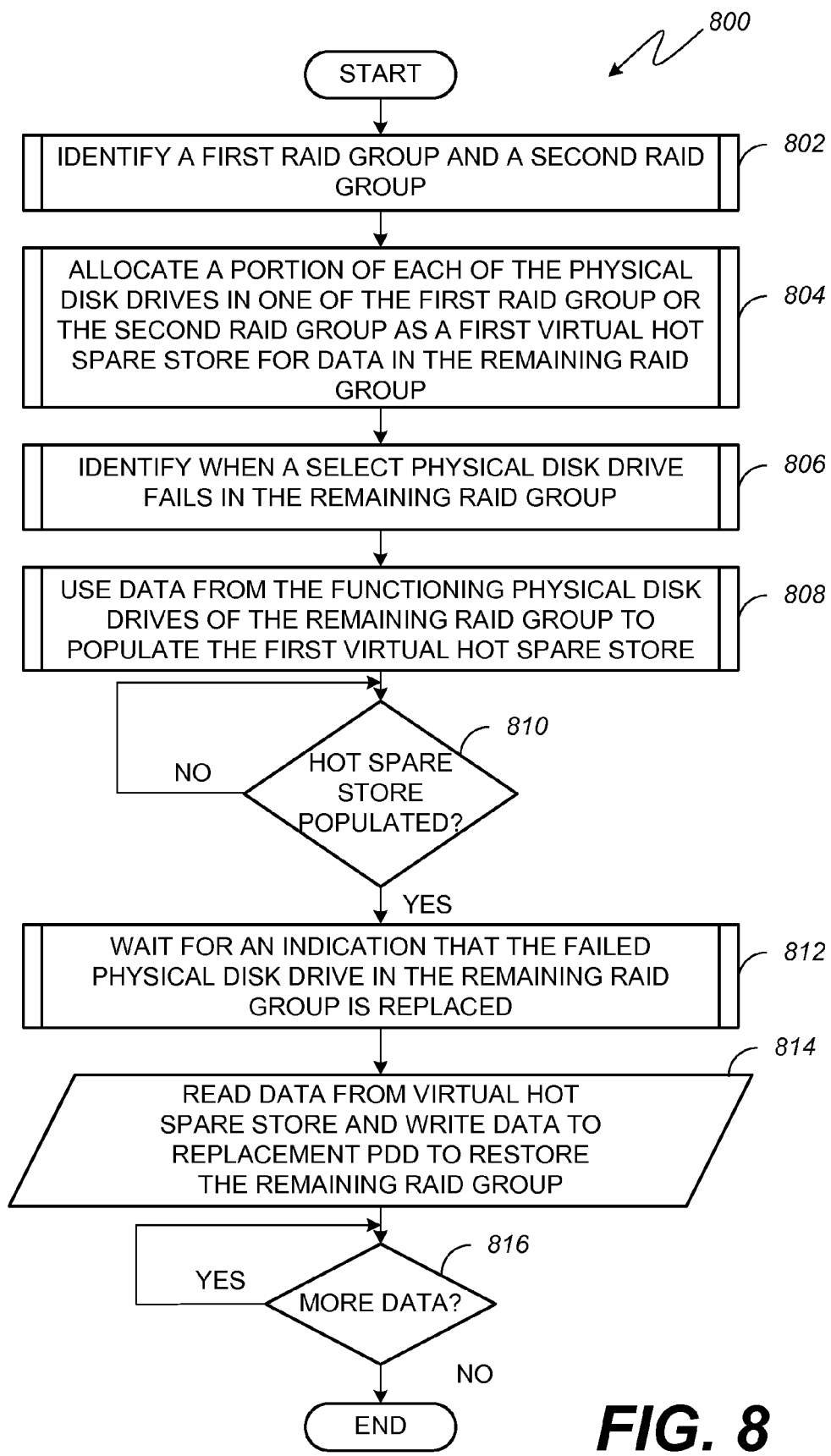
FIG. 8 is a flow diagram illustrating an embodiment of a method for reestablishing data volume redundancy after a physical disk drive failure.

FIG. 8 is a flow diagram illustrating an embodiment of a method for reestablishing data volume redundancy after a physical disk drive failure. The flow diagram of FIG. 8 shows the architecture, functionality, and operation of a possible implementation via a circuit or circuits, software and or firmware associated with the data volume rebuilder 300. In this regard, each block represents a module, segment, or portion of code, which comprises one or more executable instructions for implementing the specified function(s). When the data volume rebuilder 300 is implemented via hardware, hardware and firmware, or a combination of hardware and software, one or more blocks in the flow diagram may represent an additional circuit or circuits. Alternatively, the described functions can be embodied in source code including human-readable statements written in a programming language or machine code that comprises instructions recognizable by a suitable execution system such as a processor in a computer system. The machine code may be converted from the source code, etc.

Method 800 begins with block 802 where a first RAID group and a second RAID group are identified by a data volume rebuilder. Thereafter, in block 804, a portion of each of the physical disk drives in one of the first RAID group or the second RAID group are allocated by a data volume rebuilder as a first virtual hot spare store for data stored in the remaining RAID group. In block 806, a data volume rebuilder identifies when a physical disk drive fails in the remaining RAID group. In block 808, the data volume rebuilder uses data from the remaining functioning physical disk drives of the remaining RAID group to populate the first virtual hot spare store with the data from the failed physical disk drive. The data volume rebuilder determines in decision block 810 whether the hot spare store is completely populated. As indicated by the flow control arrows exiting the decision block 810, the data volume rebuilder waits until the hot spare store has stored the entirety of the data from the failed physical disk drive before transitioning from the first mode of operation. In block 812, the data volume rebuilder waits for an indication that the failed physical disk drive has been replaced with a functioning disk drive. Once the hot spare store is completely populated and the failed drive has been replaced with a functioning replacement disk drive, as shown in block 814, the data volume rebuilder enters a restore or rebuild mode where data is read from the virtual hot spare store and written to the appropriate locations in the replacement physical disk drive to restore the remaining RAID group to full functionality and redundancy. The data volume rebuilder determines in decision block 816 whether all data has been transferred from the virtual hot spare store to the replacement disk drive. As indicated by the flow control arrows exiting the decision block 816, the data volume rebuilder continues to transfer data as required until the entirety of the data in the virtual hot spare store has been successfully transferred to the replacement physical disk drive.

Figure 9:
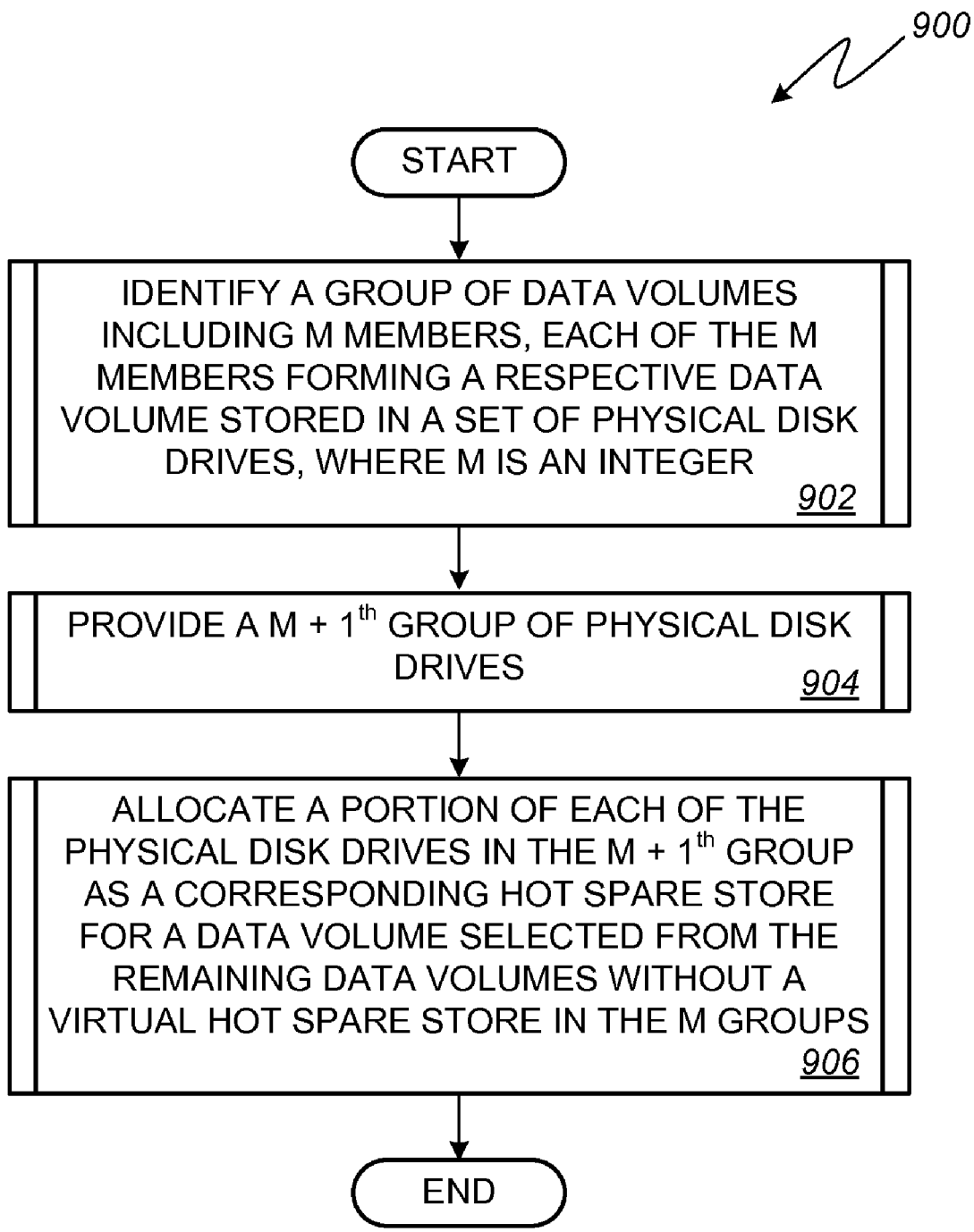
FIG. 9 is a flow diagram illustrating an embodiment of an alternative method for arranging a data storage system with a virtual hot spare store.

FIG. 9 is a flow diagram illustrating an embodiment of an alternative method for arranging a data storage system with a virtual hot spare store. Method 900 begins with block 902 where a group of data volumes including M members are identified. Each of the M members form a respective data volume stored in a set of physical disk drives, where M is an integer. In block 904, a M+1$^{th}$ group of physical disk drives is provided. Thereafter, in block 906, a portion of each of the physical disk drives in the M+1$^{th}$ group is allocated as a corresponding virtual hot spare store for a data volume selected from the remaining data volumes without a virtual hot spare store in the M groups.

Figure 10:
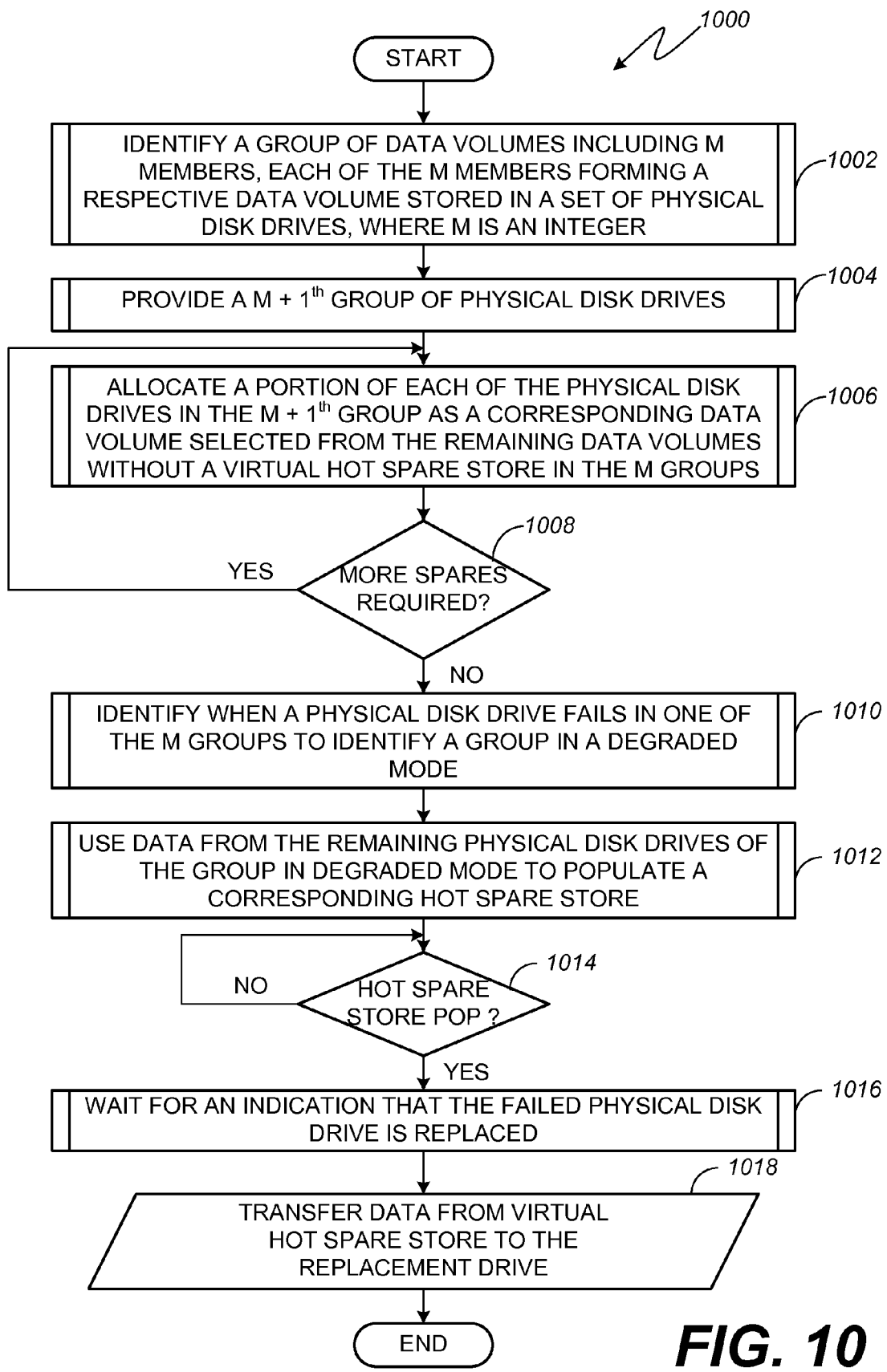
FIG. 10 is a flow diagram illustrating an embodiment of an alternative method for reestablishing data volume redundancy after a physical disk drive failure.

FIG. 10 is a flow diagram illustrating an embodiment of an alternative method 1000 for reestablishing data volume redundancy after a physical disk drive failure. The flow diagram of FIG. 10 shows the architecture, functionality, and operation of a possible implementation via a circuit or circuits, software and or firmware associated with the data volume rebuilder 300. In this regard, each block represents a module, segment, or portion of code, which comprises one or more executable instructions for implementing the specified function(s). When the data volume rebuilder 300 is implemented via hardware, hardware and firmware, or a combination of hardware and software, one or more blocks in the flow diagram may represent an additional circuit or circuits. Alternatively, the described functions can be embodied in source code including human-readable statements written in a programming language or machine code that comprises instructions recognizable by a suitable execution system such as a processor in a computer system. The machine code may be converted from the source code, etc.

Method 1000 begins with block 1002 where a data volume rebuilder identifies a group of data volumes including M members, where M is an integer. Each of the M members form a respective data volume stored in a set of physical disk drives. In block 1004, a M+1$^{th}$ group of physical disk drives is provided and coupled to the data volume rebuilder. Thereafter, in block 1006, the data volume rebuilder allocates a portion of each of the physical disk drives in the M+1$^{th}$ group as a corresponding virtual hot spare store for a data volume selected from the remaining data volumes without a virtual hot spare store in the M groups. The data volume rebuilder determines in decision block 1008 whether additional virtual hot spare stores are required. When additional virtual hot spare stores are required, the functions illustrated in block 1006 are repeated. Otherwise, processing continues with block 1010, where the data volume rebuilder identifies when a physical disk drive fails in one of the M groups to identify a group operating in a degraded mode. Thereafter, as shown in block 1012, the data volume rebuilder enters a first mode of operation where data from the remaining physical disk drives of the group operating in the degraded mode is used to populate a corresponding virtual hot spare store. In decision block 1014, the data volume rebuilder determines whether the virtual hot spare store is completely populated. As indicated by the flow control arrows exiting decision block 1014, the data volume rebuilder remains in the first mode of operation until the virtual hot spare store is completely populated with the data reconstructed from remaining functioning physical disk drives. Thereafter, in block 1016, the data volume rebuilder waits for an indication that the failed physical disk drive has been replaced with a functioning disk drive. Once the virtual hot spare store is completely populated and the failed drive has been replaced with a functioning replacement disk drive, as shown in block 1018, the data volume rebuilder enters a restore, rebuild, or second mode of operation where data is transferred from the virtual hot spare store to the appropriate locations in the replacement physical disk drive to restore the degraded RAID group to full functionality and redundancy. As described above, the data volume rebuilder continues to transfer data as required until the entirety of the data in the virtual hot spare store has been successfully transferred to the replacement physical disk drive.

While various embodiments of the data volume rebuilder and methods for arranging data volumes for improved RAID reconstruction performance have been described, it will be apparent to those of ordinary skill in the art that many more embodiments and implementations are possible that are within the scope of this disclosure. Accordingly, the described data volume rebuilder and methods are not to be restricted or otherwise limited except in light of the attached claims and their equivalents.

What is claimed is:

1. A method for arranging a group of data volumes each stored in a separate redundant array of independent disks (RAID), the method comprising:

identifying a first RAID group and a second RAID group; and allocating a portion of the storage capacity of each of the physical disk drives in one of the first RAID group or the second RAID group as a first virtual hot spare store for data in the remaining RAID group, wherein allocating a portion of the storage capacity of each of the physical disk drives in one of the first RAID group or the second RAID group comprises allocating the product of 1/N and a storage capacity of each of the N physical disk drives in one of the first RAID group or the second RAID group.

2. The method of claim 1, further comprising:

identifying when an identified physical disk drive fails in the remaining RAID group; and using data from the functioning physical disk drives of the remaining RAID group to populate the first virtual hot spare store.

3. The method of claim 2, wherein when the identified physical disk drive comprises a physical disk drive with parity data, a data volume rebuilder generates the lost parity data from the functioning physical disk drives of the remaining RAID group and populates the parity data in the first virtual hot spare store.

4. The method of claim 2, wherein when the identified physical disk drive comprises a physical disk drive with data, a data volume rebuilder generates the lost data from the functioning physical disk drives of the remaining RAID group and populates the lost data in the first virtual hot spare store.

5. The method of claim 2, wherein the identified physical disk drive comprises a physical disk drive with data and parity data, a data volume rebuilder generates the lost data and the lost parity data from the functioning physical disk drives of the remaining RAID group and populates the lost data and the lost parity data in the first virtual hot spare store.

6. The method of claim 2, further comprising:

replacing the identified physical disk drive in the remaining RAID group with a replacement physical disk drive.

7. The method of claim 6, further comprising:

determining when the first virtual hot spare store is populated with the data from the identified physical disk drive from the remaining RAID group;

reading the data from the first virtual hot spare store; and writing the data from the first virtual hot spare store to the replacement physical disk drive.

8. The method of claim 1, further comprising:

allocating a portion of the storage capacity of each of the physical drives in the remaining RAID group as a second virtual hot spare store for data in the RAID group hosting the first virtual hot spare store;

identifying when an identified physical disk drive fails in the RAID group hosting the first virtual hot spare store; and using data from the functioning physical disk drives of the RAID group hosting the first virtual hot spare store to populate the second virtual hot spare store.

9. The method of claim 8, wherein when the identified physical disk drive fails in the RAID group hosting the first virtual hot spare store is storing parity data, a data volume rebuilder generates the lost parity data from the functioning physical disk drives of the RAID group hosting the first virtual hot spare store and populates the parity data in the second virtual hot spare store.

10. The method of claim 8, wherein when the identified physical disk drive fails in the RAID group hosting the first virtual hot spare store is storing non-parity data, a data volume rebuilder generates the lost data from the functioning physical disk drives of the RAID group hosting the first virtual hot spare store and populates the lost data in the second virtual hot spare store.

11. The method of claim 8, wherein when the identified physical disk drive fails in the RAID group hosting the first virtual hot spare store is storing both non-parity and parity data, a data volume rebuilder generates the lost from the functioning physical disk drives of the RAID group hosting the first virtual hot spare store and populates the lost data in the second virtual hot spare store.

12. The method of claim 8, further comprising:

replacing the identified physical disk drive in the RAID group hosting the first virtual hot spare store with a replacement physical disk drive.

13. The method of claim 12, further comprising:

determining when the second virtual hot spare store is populated with the data from the identified physical disk drive from the RAID group hosting the first virtual hot spare store;

reading the data from the second virtual hot spare store; and writing the data from the second virtual hot spare store to the replacement physical disk drive.

14. A method for arranging a group of data volumes each stored in a separate redundant array of independent disks (RAID), the method comprising:

identifying a first RAID group and a second RAID group;

allocating a portion of the storage capacity of each of the physical disk drives in one of the first RAID group or the second RAID group as a first virtual hot spare store for data in the remaining RAID group;

identifying when an identified physical disk drive fails in the remaining RAID group;

using data from the functioning physical disk drives of the remaining RAID group to populate the first virtual hot spare store; and determining the storage capacity of the identified physical disk drive that failed and wherein each of the allocating steps comprises an on-the-fly allocation responsive to the storage capacity of the identified physical disk drive that failed.

15. A data storage system including data volumes arranged in separate redundant arrays of independent disks, the data storage system comprising:

a data volume rebuilder communicatively coupled to each physical disk drive of a first RAID group and each physical disk drive of a second RAID group, the data volume rebuilder arranged to enter a first mode of operation in response to an indication that one of the RAID groups is functioning in a reduced mode of operation due to a failure of an individual physical disk drive in the data storage system, the first mode of operation performing a step-wise reconstruction of a first data volume stored in the RAID group that is operating in a reduced mode of operation in the remaining RAID group, the step-wise reconstruction populating a virtual hot spare; and a capacity manager configured to enable an administrator to use thin provisioning to expose data to users of an identified data volume and withhold remaining available storage capacity for virtual hot spare data.

16. The data storage system of claim 15, wherein after the failed physical disk drive is replaced by a new physical disk drive, the data volume rebuilder enters a second mode of operation, the second mode of operation performing a rebuild operation to move the data in the virtual hot spare to the new physical disk drive.

17. The data storage system of claim 15, wherein the second RAID group is dedicated to receive and store virtual hot spare data.

18. The data storage system of claim 15, wherein the data storage space in each of the physical disk drives in the remaining RAID group used for the virtual hot spare is allocated as needed.

19. The data storage system of claim 15, wherein the capacity manager provides an option to the administrator to reallocate virtual hot spare storage space to the identified data volume.

* * * * *